US008294913B2

(12) United States Patent
You et al.

(10) Patent No.: US 8,294,913 B2
(45) Date of Patent: Oct. 23, 2012

(54) IMAGE FORMING APPARATUS, IMAGE FORMING SYSTEM AND CONTROL METHOD IN IMAGE FORMING APPARATUS

(75) Inventors: Chang-nam You, Gyeongsan-si (KR); Ki-hong Im, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 645 days.

(21) Appl. No.: 12/554,093

(22) Filed: Sep. 4, 2009

(65) Prior Publication Data

US 2010/0060921 A1 Mar. 11, 2010

(30) Foreign Application Priority Data

Sep. 9, 2008 (KR) ................................ 2008-89006

(51) Int. Cl.

| | |
|---|---|
| ***G06F 3/12*** | (2006.01) |
| ***H04N 1/40*** | (2006.01) |
| ***G06K 9/00*** | (2006.01) |
| *H04N 1/60* | (2006.01) |
| *H04N 1/46* | (2006.01) |
| *G06K 9/46* | (2006.01) |
| *G06K 9/66* | (2006.01) |
| *G06K 9/40* | (2006.01) |

(52) U.S. Cl. ...... 358/1.13; 358/3.26; 358/448; 358/531; 358/1.9; 382/135; 382/195; 382/112; 382/266

(58) Field of Classification Search ........................ None
See application file for complete search history.

(56) References Cited

U.S. PATENT DOCUMENTS

| | | | | |
|---|---|---|---|---|
| 6,078,683 | A * | 6/2000 | Denison et al. | 382/135 |
| 6,236,745 | B1 * | 5/2001 | Chen et al. | 382/135 |
| 6,870,958 | B2 * | 3/2005 | Murakawa et al. | 382/195 |
| 7,012,624 | B2 * | 3/2006 | Zhu et al. | 345/639 |
| 2002/0093700 | A1 * | 7/2002 | Braun et al. | 358/531 |
| 2004/0027618 | A1 * | 2/2004 | Nakamura et al. | 358/3.26 |
| 2009/0214085 | A1 * | 8/2009 | Bickell et al. | 382/112 |
| 2009/0274386 | A1 * | 11/2009 | Panetta et al. | 382/266 |

* cited by examiner

*Primary Examiner* — Satwant Singh
(74) *Attorney, Agent, or Firm* — Staas & Halsey LLP

(57) ABSTRACT

An image forming apparatus, an image forming system including the same, and a control method of the image forming apparatus, the image forming apparatus including: an output unit; a scanning unit to scan a damaged bank note and generate image data therefrom; and a controller to calculate an area of the damaged bank note using the generated image data of the scanned damaged bank note and to control the output unit to output damaged bank note information including the calculated area of the damaged bank note and/or an exchangeable value of the damaged bank note corresponding to the area of the damaged bank note.

22 Claims, 7 Drawing Sheets

IMAGE FORMING APPARATUS, IMAGE FORMING SYSTEM AND CONTROL METHOD IN IMAGE FORMING APPARATUS

CROSS-REFERENCE TO RELATED APPLICATION

This application claims the benefit of Korean Patent Application No. 2008-89006, filed Sep. 9, 2008 in the Korean Intellectual Property Office, the disclosure of which is incorporated herein by reference.

BACKGROUND OF THE INVENTION

1. Field of the Invention

Aspects of the present invention relate to an image forming apparatus, an image forming system, and a control method of the image forming apparatus that measures a remaining area of a damaged bank note.

2. Description of the Related Art

In general, a bank note (such as a paper currency) may be damaged, for example, due to fire, floods, chemicals, explosives, etc. Such a damaged bank note may be exchanged for a new bank note corresponding to all or a part of a face value of the damaged bank note according to the remaining area (i.e., undamaged area) thereof.

For example, in Korea, if the remaining area of a damaged bank note is 75% or more of the whole area of an original bank note, the damaged bank note can be exchanged for a new bank note corresponding to all of the face value thereof. Furthermore, if the remaining area thereof is 40% or more of the original bank note, the damaged bank note can be exchanged for a new bank note corresponding to a half of the face value thereof.

Conventionally, a visual inspection has been used to measure the remaining area of a damaged bank note. That is, the remaining area has been calculated based on a number of marks observed on the damaged bank note. However, such a method is incorrect in that the visual observation has a limited precision, and mark measurement is made by a human naked eye, thereby causing disputes between an owner of the damaged bank note and the authorities in charge of bank note exchange.

SUMMARY OF THE INVENTION

Aspects of the present invention provide an image forming apparatus, an image forming system, and a control method of the image forming apparatus that measures a remaining area of a damaged bank note, thereby enhancing user convenience.

According to an aspect of the present invention, there is provided a control method of an image forming apparatus, the method including: scanning a damaged bank note to generate image data therefrom; calculating an area of the damaged bank note using the generated image data of the scanned damaged bank note; and outputting damaged bank note information including the calculated area of the damaged bank note and/or an exchangeable value of the damaged bank note corresponding to the area of the damaged bank note.

The calculating of the area may include: extracting an image contour of the damaged bank note; and calculating the area of the damaged bank note using a number of pixels in the extracted image contour.

The calculating of the area may include, if the damaged bank note includes a plurality of pieces, calculating the area of the damaged bank note based on a total number of pixels in the extracted image contours of the respective pieces.

The outputting may include displaying the damaged bank note information through a display unit and/or a printing unit of the image forming apparatus and/or a host display unit of a host apparatus connected to the image forming apparatus.

The method may further include confirming a kind of the damaged bank note.

The method may further include calculating the exchangeable value of the damaged bank note based on a ratio between the calculated area of the damaged bank note and a predetermined area of an original bank note.

The damaged bank note information may include a kind of the damaged bank note, an area of an original bank note, a ratio between the area of the damaged bank note and the area of the original bank note, an image of the damaged bank note, and/or an image of the original bank note.

The method may further include selecting a damaged bank note measuring mode.

According to another aspect of the present invention, there is provided: an image forming apparatus, including: an output unit; a scanning unit to scan a damaged bank note and generate image data therefrom; and a controller to calculate the area of the damaged bank note using the generated image data of the scanned damaged bank note and to control the output unit to output damaged bank note information including the calculated area of the damaged bank note and/or an exchangeable value of the damaged bank note corresponding to the area of the damaged bank note.

The controller may extract an image contour of the damaged bank note and calculate the area of the damaged bank note based on a number of pixels in the extracted image contour.

If the damaged bank note includes a plurality of pieces, the controller may calculate the area of the damaged bank note based on a total number of pixels in the extracted image contours of the respective pieces.

The apparatus may further include a communication unit to communicate with a host apparatus, wherein the controller may control the communication unit to transmit the damaged bank note information to the host apparatus.

The controller may confirm the kind of the damaged bank note based on the image data of the scanned damaged bank note.

The damaged bank note information may include a kind of the damaged bank note, an area of an original bank note, a ratio between the area of the damaged bank note and the area of the original bank note, an image of the damaged bank note, and/or an image of the original bank note.

The apparatus may further include a selection unit through which a damaged bank note measuring mode is selected.

According to yet another aspect of the present invention, there is provided an image forming system, including: a host apparatus; and an image forming apparatus including: a communication unit to communicate with the host apparatus; a scanning unit to scan a damaged bank note and to generate image data therefrom, and a controller to calculate an area of the damaged bank note using the generated image data of the scanned damaged bank note and to control the communication unit to transmit the calculated area of the damaged bank note to the host apparatus; and the host apparatus includes a host display unit to display damaged bank note information including the area of the damaged bank note received from the image forming apparatus.

The damaged bank note information may include an exchangeable value of the damaged bank note corresponding to the area of the damaged bank note.

According to still another aspect of the present invention, there is provided a control method of determining an exchangeable value of a damaged bank note, the method including: receiving, in a host device, image data corresponding to the damaged bank note; calculating the exchangeable value of the damaged bank note corresponding to an area of the damaged bank note based on a predetermined exchange guideline stored in the host device.

According to another aspect of the present invention, there is provided a host device to determine an exchangeable rate of a damaged bank note, the host device including: a communication unit to receive image data corresponding to the damaged bank note; and a controller to calculate the exchangeable value of the damaged bank note corresponding to an area of the damaged bank note based on a predetermined exchange guideline stored in the host device.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the embodiments, taken in conjunction with the accompanying drawings, in which.

DETAILED DESCRIPTION OF THE EMBODIMENTS

Figure 1:
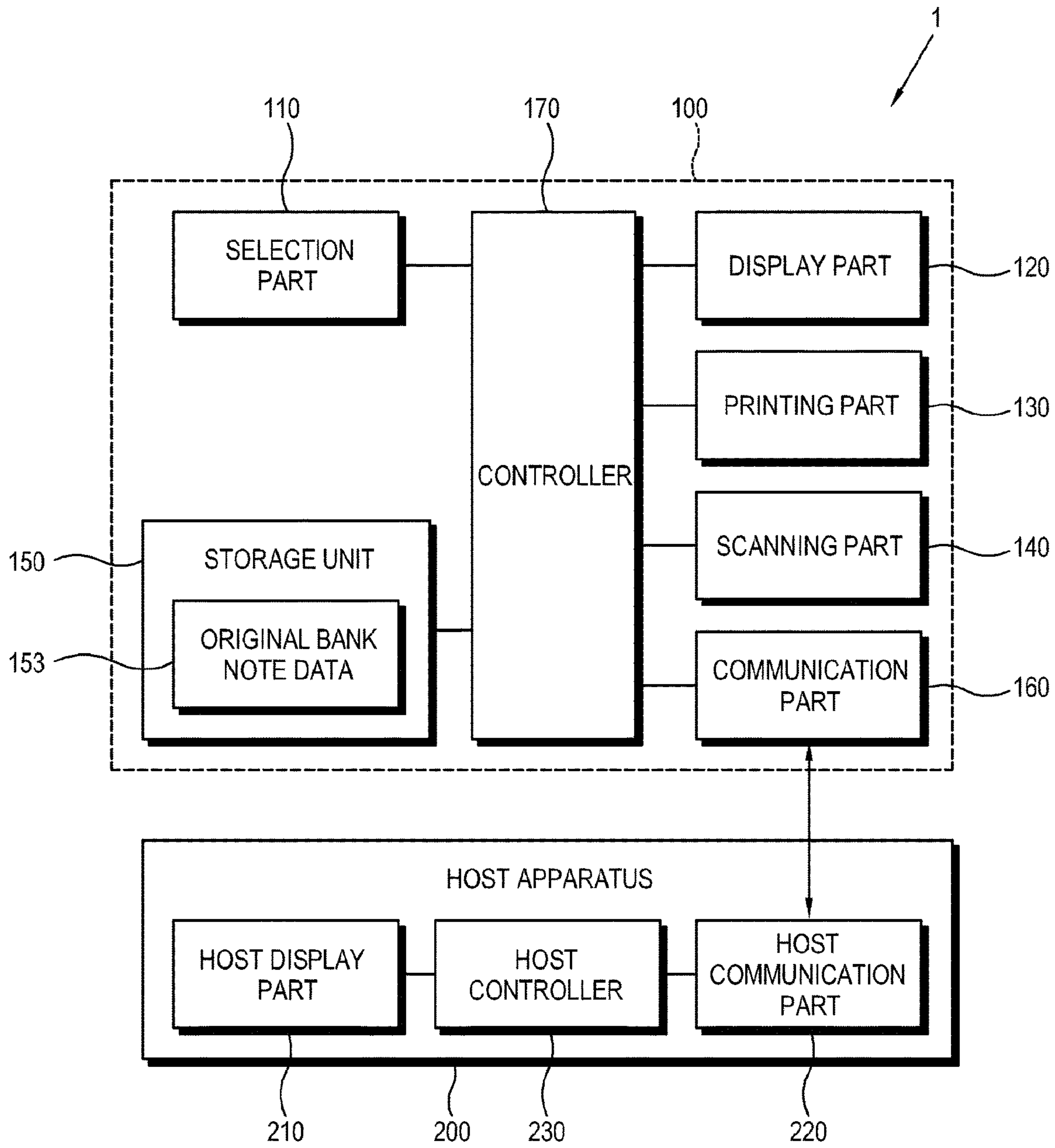
FIG. 1 is a schematic block diagram illustrating an image forming system according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 is a schematic block diagram illustrating an image forming system 1 according to an embodiment of the present invention. Referring to FIG. 1, the image forming system 1 includes an image forming apparatus 100, and a host apparatus 200.

The image forming apparatus 100 includes a selection part 110 to select a damaged bank note measuring mode, a display part 120, a printing part 130, a scanning part 140 to scan a damaged bank note, a communication part 160, a controller 170 to control these components, and a storage unit 150.

The image forming apparatus 100 provides a scanning operation to transmit image data scanned through the scanning part 140 to the host apparatus 200 through the communication part 160, a printing operation to convert image data received from the host apparatus 200 into printing data for printing through the printing part 130, and an output operation to output the image data scanned through the scanning part 140 through the printing part 130. Furthermore, the image forming apparatus 100 may also provide a facsimile operation to transmit facsimile data through a Public Switched Telephone Network (PSTN) and to print the received facsimile data.

The selection part 110 may include one or more input devices (such as a keyboard, a touch screen, a rotating dial, an input key (not shown) provided on a top face of a main body 101 (see FIG. 2) of the image forming apparatus 100, etc.). According to a user manipulation of and/or input to the input device, the image forming apparatus 100 enters into a damaged bank note measuring mode. However, it is understood that aspects of the present invention are not limited thereto. For example, according to other aspects, the image forming apparatus 100 may be used only for measurement of a damaged bank note, and thus does not include the selection part 110. Furthermore, according to another aspect, the damaged bank not measuring mode is a default mode such that a selection thereof is not performed.

The display part 120 may include an LCD panel provided adjacent to the selection part 110, or may integrate the selection part 110 (for example, as a touch screen).

The printing part 130 may employ an electrophotographic type in which an image is formed on a print medium (such as paper, a transparency, etc.) through a processes of electrification, light exposure, development, transfer, fixing, and cleaning, an inkjet type in which an image is formed through jetting ink droplets, and/or a thermal transfer type in which an image is formed by applying heat to a specific print medium using a thermal printing head on the specific print medium. For example, in the case of the electrophotographic type, the printing part 130 may include a photosensitive body, an electrifying roller to electrify the photosensitive body, a light exposing unit to light-expose an electrified surface of the photosensitive body to form an electrostatic latent image thereon, a developing roller to develop the electrostatic latent image with a developer, a transfer roller to transfer the developer from the surface of the photosensitive body to a print medium, and/or a fixing unit to fix the transferred developer onto the print medium under heat and pressure. In the case of the inkjet type, the printing part 130 may include an ink chamber, a substrate having a nozzle through which ink in the ink chamber is discharged, and a driving unit to discharge the ink in the ink chamber through the nozzle. The driving unit may include a piezoelectric element and/or a heater.

The scanning part 140 may include a Charge Coupled Device (CCD), a Complementary Metal-Oxide Semiconductor (CMOS) sensor, and/or a Contact Image Sensor (CIS).

The image forming apparatus 100 and the host apparatus 200 communicate data therebetween through the communication part 160 and a host communication part 220. The communication part 160 may include a serial port, a parallel port, a USB port, and/or network interface card, though aspects of the present invention are not limited thereto. For example, according to other aspects, the communication part 160 may include an infrared port or a Bluetooth port.

Figure 2:
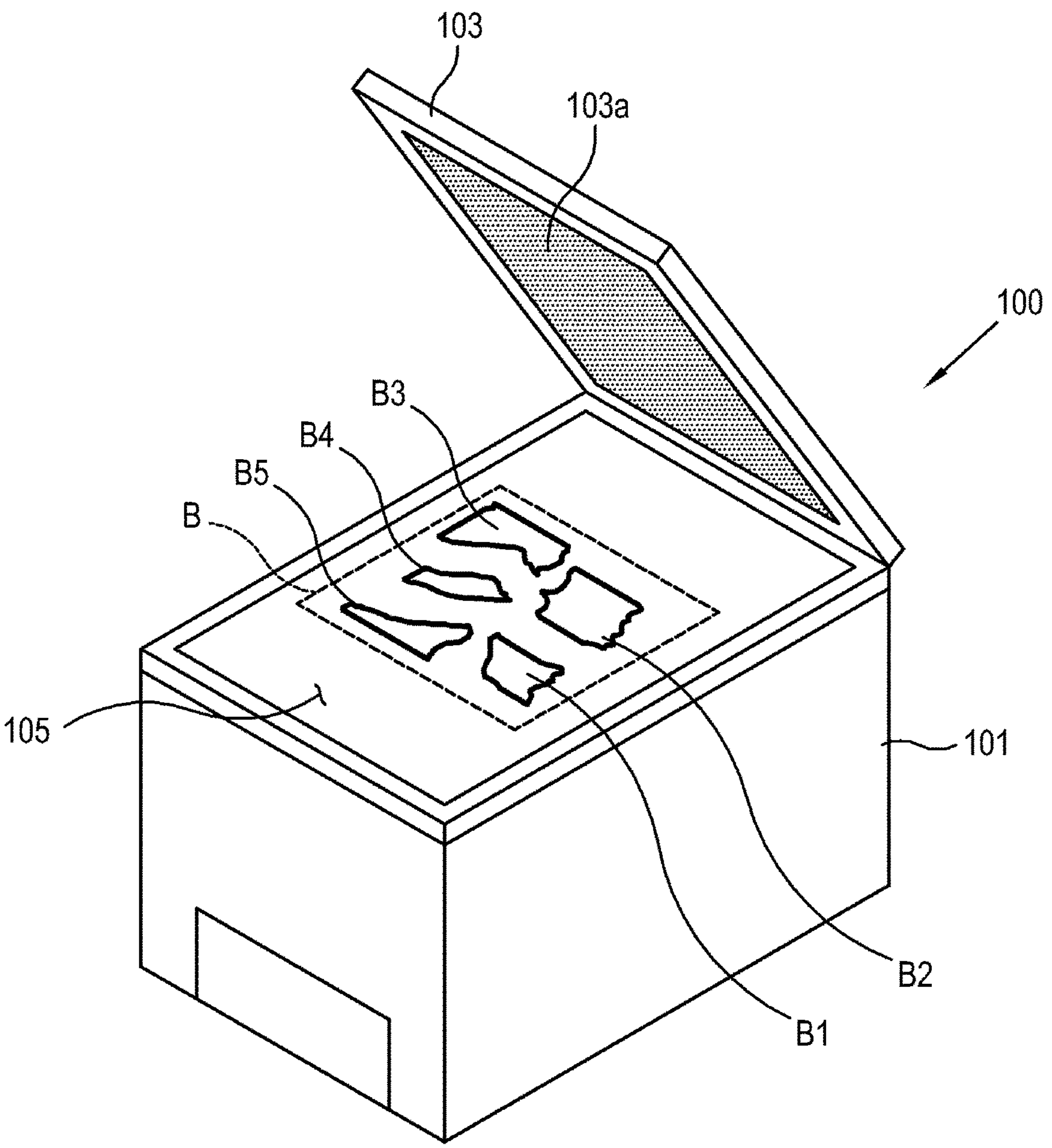
FIG. 2 is a schematic perspective view illustrating an image forming apparatus according to an embodiment of the present invention, with a cover being opened and a damaged bank note being put on a platen.

The controller 170 controls, the scanning part 140 to scan a damaged bank note. As shown in FIG. 2, a damaged bank note B may be put on a platen 105 made of transparent glass or the like that is provided on a top part of the scanning part 140. In this respect, the controller 170 may inform a user that the user can put the damaged bank note B on the platen 105. As illustrated, the image forming apparatus 100 further includes a cover 103 rotatably installed to a side edge of the main body 101 to selectively open and close the platen 105.

The controller 170 calculates the remaining area (i.e., undamaged area) of the damaged bank note B based on image data of the damaged bank note B scanned through the scanned part 140. Specifically, the controller 170 extracts a contour of an image of the damaged bank note B from the image data using a contour extraction algorithm. The contour extraction is made based on a brightness difference using a differential operator. The extraction algorithm may include Sobel, Prewitt, Robert, Laplacian, Canny, or the like. In order to facilitate the contour extraction by distinguishing the brightness difference between an image area of the damaged bank note B and the other area on the platen 105, as shown in FIG. 2, the cover 103 may include a lower face 103*a* having a dark color such as black.

After the contour extraction, the controller 170 adds or determines the number of pixels in the extracted contour. The number of the pixels differs depending on a scanning resolution. Therefore, according to aspects of the present invention, the area of the damaged bank note B may be calculated based on the number of the pixels in consideration of the scanning resolution.

Figure 3:
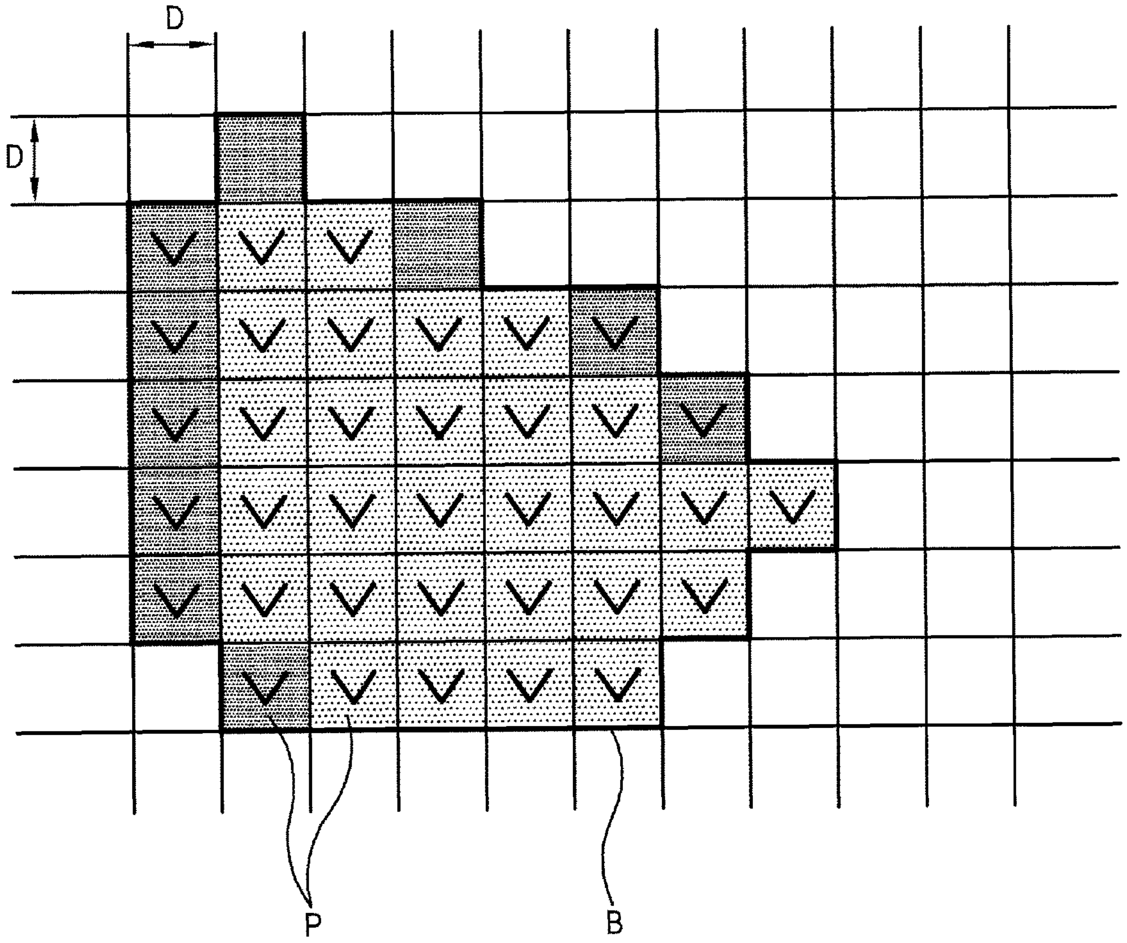
FIG. 3 is a diagram illustrating a method of calculating a remaining area of a damaged bank note based on a number of pixels of the damaged bank note.

FIG. 3 shows an example of image data of a damaged bank note B formed of N number of pixels P. Thus, an area A of the damaged bank note B is calculated according to the following equation 1:

$$A=N*D^2,$$

where D is a length of each side of a unit pixel and may be calculated by the following equation 2:

$$D=2.54\text{ cm/dpi (scanning resolution)}.$$

For example, if the damaged bank note B is scanned at a scanning resolution of 300 dots per inch (dpi), D is 0.00846 cm according to the equation 2. In this case, if the number of pixels in the contour of the damaged bank note B is 500,000, the area of the damaged bank note B is 35.7858 $cm^2$ according to the equation 1.

While in the present embodiment, the area of the damaged bank note B is calculated using the equations 1 and 2, it is understood that the area may be calculated by different methods based on the number of pixels in other embodiments. For example, the area may be calculated according to a proportional relationship, instead of the equations 1 and 2. Specifically, if the number of pixels in an image contour of an original bank note is preset at a certain resolution and is stored in the storage unit 150, and if the number of pixels in the image contour of the damaged bank note B is measured in the damaged bank note measuring mode, the area of the damaged bank note B can be calculated using a ratio therebetween. For example, if the number of pixels of an original bank note is 1,000,000 at a resolution of 300 dpi and the area of the original bank note is 71.5716 $cm^2$, and if the measured number of pixels in the image contour of the damaged bank note B is 500,000, the area of the damaged bank note B is 35.7858 $cm^2$, which is ½ of the area of the original bank note according to the proportional relationship therebetween.

In this respect, the number of pixels in the image contour of the original bank note at various resolutions including 300 dpi may be stored in the storage unit 150. Thus, the area of the damaged bank note B can be calculated by using a proportional relationship between the number of pixels in the image contour of the damaged bank note B at a specific resolution and the number of pixels in an image contour of an original bank note at the specific resolution.

As shown in FIG. 2, if the damaged bank note B includes several pieces B1, B2, B3, B4 and B5, the area of the damaged bank note B is calculated based on the total number of pixels in image contours of the pieces B1, B2, B3, B4 and B5. Accordingly, the remaining area of a damaged bank note is correct, simple and efficient, as compared with the conventional method described above.

Then, the controller 170 controls the display part 120 and/or the printing part 130 to output (i.e., display and/or print) damaged bank note information including the measured area of the damaged bank note B and/or an exchangeable value of the damaged bank note B.

Figure 4:
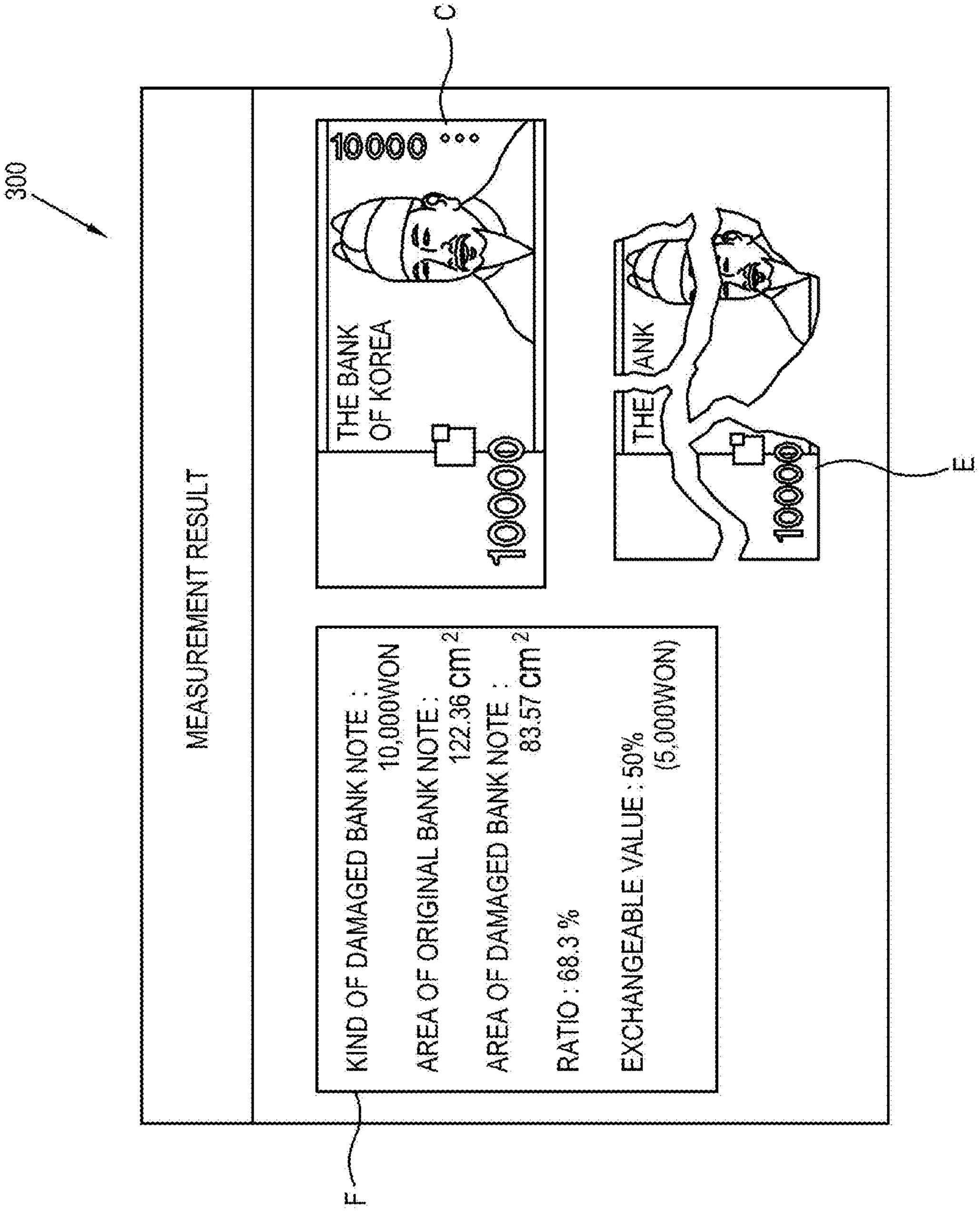
FIGS. 4 and 5 respectively illustrate output results of damaged bank note information for different kinds of damaged bank notes in the image forming system of FIG. 1.
Figure 5:
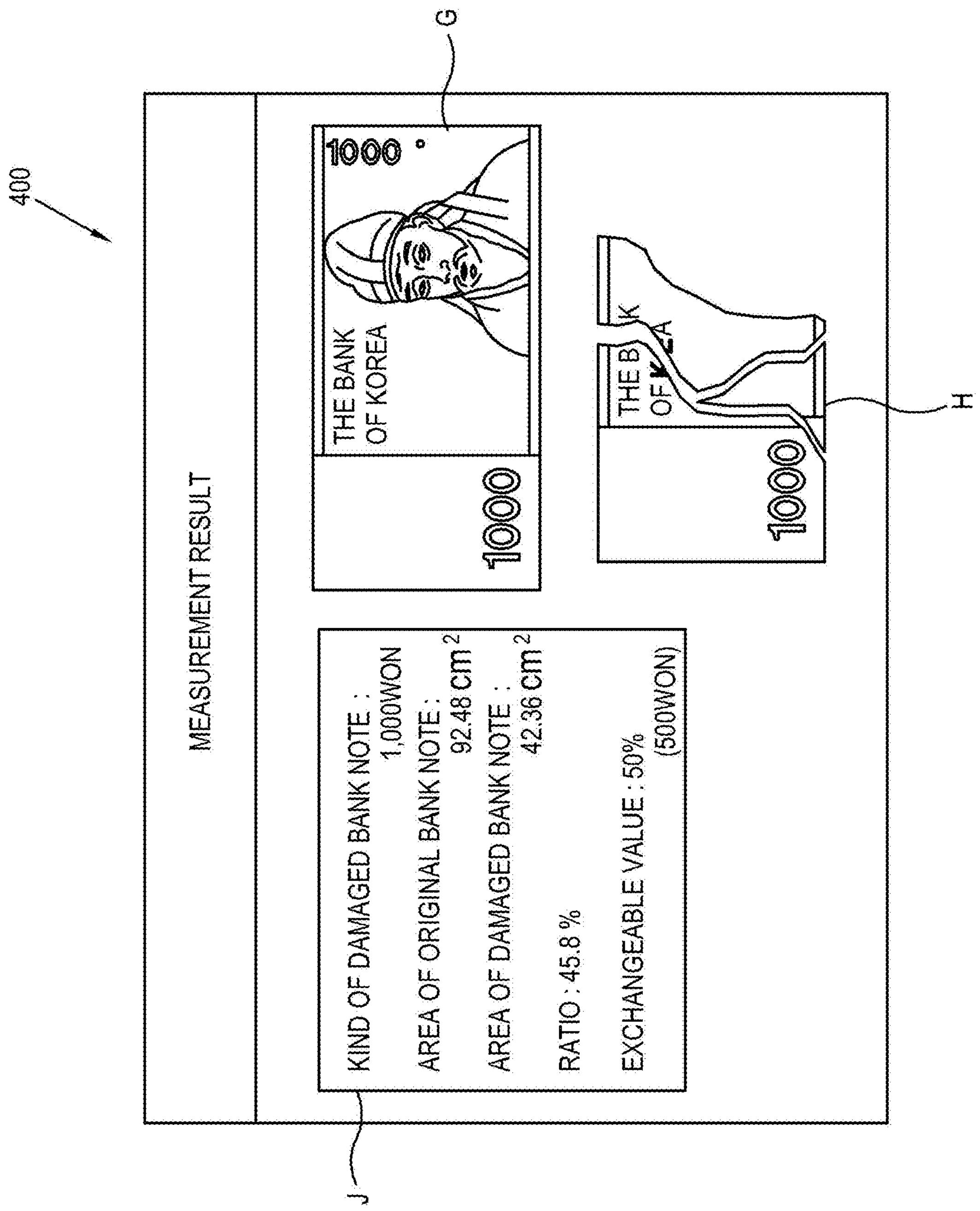

FIGS. 4 and 5 respectively show examples of output results 300 and 400 of damaged bank note information for different kinds of damaged bank notes. While Korean bank notes are illustrated in FIGS. 4 and 5, it is understood that aspects of the present invention are applicable to any currency. Referring to FIGS. 4 and 5, damaged bank note information may include the areas (83.57 $cm^2$ and 42.36 $cm^2$) and exchangeable values (5,000 won and 0 won) of two kinds of damaged bank notes E and H. Accordingly, the exchangeable values thereof can be, though not necessarily, calculated from the displayed areas with reference to a predetermined exchange guideline. Moreover, the damaged bank note information may further include the kind of a damaged bank note (for example, 1,000 won or 10,000 won), the area of an original bank note, and a ratio between the areas of the damaged bank note and the original bank note. The damaged bank note information includes text-based information F and J, and may be displayed through the display part 120 of the image forming apparatus 100 and/or printed through the printing part 130 of the image forming apparatus 100. Furthermore, the damaged bank note information may include graphic information such as an image C or G of an original bank note and an image E or H of a damaged bank note, as shown in FIGS. 4 and 5. Accordingly, a user can confirm images of original and damaged bank notes, the areas of the original and damaged bank notes, and/or an exchangeable value of the damaged bank note through a sheet of printed material, thereby enhancing user convenience and preventing disputes for an exchangeable value of a damaged bank note.

Further, the controller 170 may confirm the kind of a damaged bank note put on the platen 105 by determining whether there exists identification information unique to each bank note in scanned image data of the damaged bank note, though it is understood that aspects of the present invention are not limited thereto. For example, according to other aspects, the kind of a damaged bank note may be inputted through the selection part 110 by a user. Also, the controller 170 may transmit the damaged bank note information to the host apparatus 200, in addition to or rather than outputting the damaged bank note information through the printing part 130 and/or the display part 120.

Referring to FIG. 1, the storage part 150 stores original bank note information 153, which may include a kind of an original bank note, an area of the original bank note, and/or an image of the original bank note.

The host apparatus 200 includes a host display part 210, a host communication part 220, and a host controller 230 to control these components. The host apparatus 200 may control, if damaged bank note information is received through the host communication part 220, the host display part 210 to display the damaged bank note information. The received damaged bank note information may include all of the text-based information (for example, F and J in FIGS. 4 and 5) or part of the text-based information (for example, the area of a damaged bank note and/or an exchangeable value thereof).

The received damaged bank note information may further include graphic data (for example, images C and E of original and damaged bank notes in FIG. 4).

Then, measurement results as shown in FIGS. 4 and 5 may be displayed through a user interface on the host display part 210. In this way, a user can execute the damaged bank note measuring mode in the image forming apparatus 100 and transmit the measurement result to the remote host apparatus 200. Accordingly, a remote manager, for example, may monitor the result through the host apparatus 200. The host apparatus 200 may further include a host storage unit (not shown) to store the measurement result, thereby enabling history management for the damaged bank note measuring mode.

Figure 6:
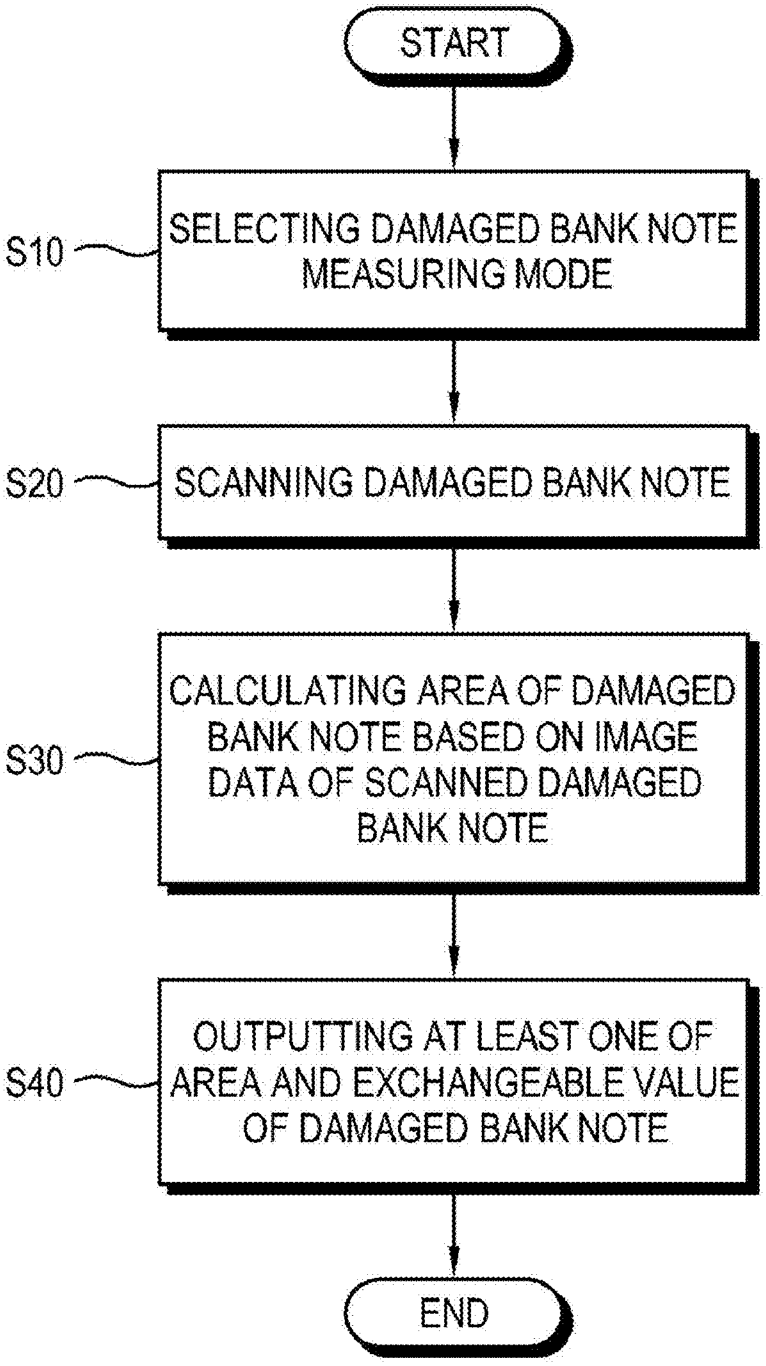
FIG. 6 is a flowchart illustrating a control method of an image forming apparatus according to an embodiment of the present invention.

Hereinafter, a control method of an image forming apparatus according to an embodiment of the present invention will be described with reference to FIG. 6. Referring to FIG. 6, the damaged bank note measuring mode is selected through the selection part 110 of the image forming apparatus 100 in operation S10. Alternatively, the selection may be indirectly made through the host apparatus 200. Furthermore, operation S10 may be omitted in other embodiments (for example, in the case that the image forming apparatus 100 is used only for measurement of a damaged bank note or measurement of a damaged bank note is a default setting for the image forming apparatus 100).

Then, the damaged bank note is scanned through the scanning part 140 in operation S20. The area of the damaged bank note is calculated based on image data of the scanned damaged bank note (operation S20) through the above-described calculation method in operation S30. Accordingly, the area of the damaged bank note and/or an exchangeable value thereof is outputted through the display part 120 and/or the printing part 130 in operation S40. In other embodiments, the area and/or the exchangeable value of the damaged bank note may be transmitted to the host apparatus 200 in addition to or instead of through the display part 120 and/or the printing part 130.

Figure 7:
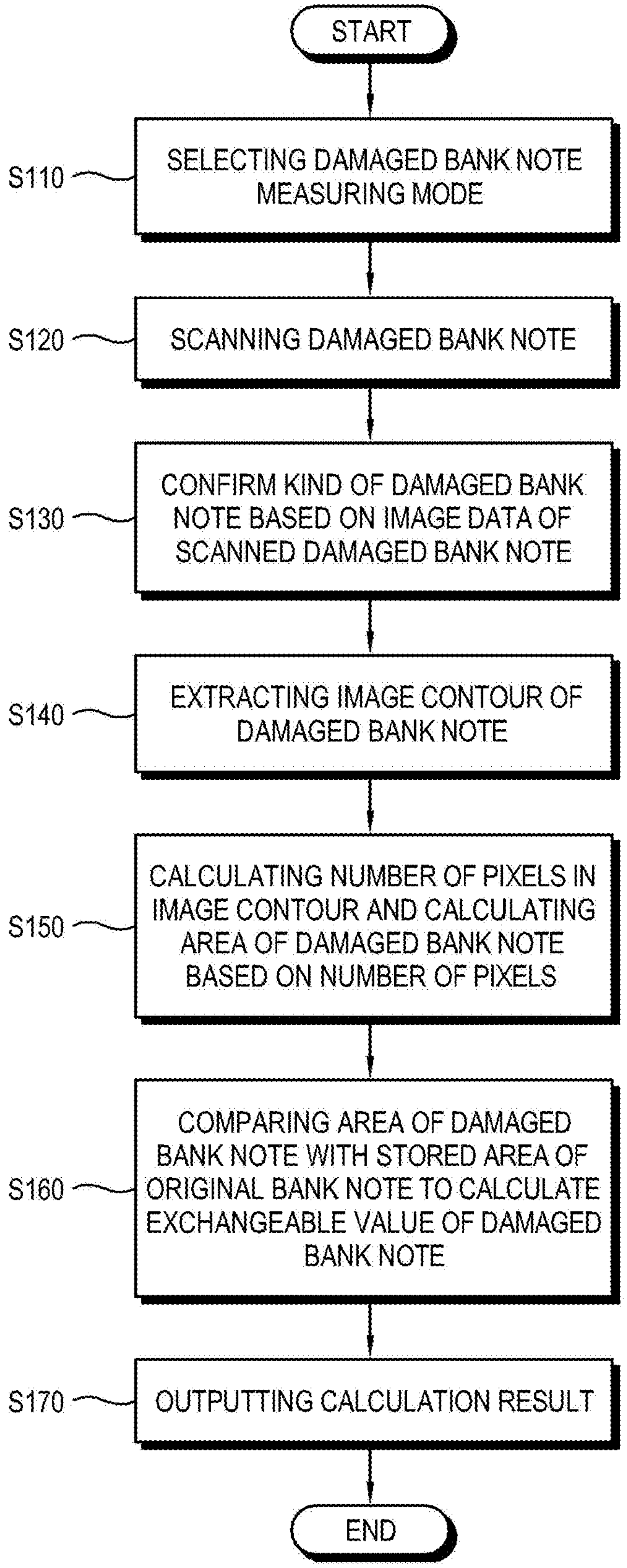
FIG. 7 is a flowchart illustrating a control method of an image forming apparatus according to another embodiment of the present invention.

Hereinafter, a control method in an image forming apparatus according to another embodiment of the present invention will be described with reference to FIG. 7. Referring to FIG. 7, the damaged bank note measuring mode is selected in operation S110. Alternatively, the selection may be indirectly made through the host apparatus 200. Furthermore, operation S110 may be omitted in other embodiments (for example, in the case that the image forming apparatus 100 is used only for measurement of a damaged bank note or measurement of a damaged bank note is a default setting for the image forming apparatus 100)

The damaged bank note is scanned in operation S120. The kind of the damaged bank note is confirmed based on image data of the scanned damaged bank note in operation S130. According to other embodiments, the kind of the damaged bank note may be inputted by a user or may be set by default in the image forming apparatus 100. According to the image data (operation S120), an image contour of the damaged bank note is extracted in operation S140. The number of pixels in the extracted image contour (operation S140) of the damaged bank note is calculated, and the area of the damaged bank note is calculated based on the number of the pixels in operation S150. Accordingly, the calculated area (operation S150) of the damaged bank note is compared to the area of an original bank note stored in the storage unit 150 (or input by a user) to calculate an exchangeable value of the damaged bank note with reference to a predetermined exchange guideline in operation S160. The calculated result (operation S160) is outputted through the display part 120, the printing part 130 of the image forming apparatus 100, and/or the host display part of the host apparatus 200 in operation S170.

While not restricted thereto, aspects of the present invention can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Aspects of the present invention may also be realized as a data signal embodied in a carrier wave and comprising a program readable by a computer and transmittable over the Internet.

Although a few embodiments of the present invention have been shown and described, it would be appreciated by those skilled in the art that changes may be made in this embodiment without departing from the principles and spirit of the invention, the scope of which is defined in the appended claims and their equivalents.

What is claimed is:

1. A control method of an image forming apparatus, the method comprising:

scanning a damaged bank note to generate image data therefrom;

calculating an area of the damaged bank note using the generated image data of the scanned damaged bank note; and outputting damaged bank note information including the calculated area of the damaged bank note and/or an exchangeable value of the damaged bank note corresponding to the calculated area of the damaged bank note.

2. The method as claimed in claim 1, wherein the calculating of the area comprises:

extracting an image contour of the damaged bank note; and calculating the area of the damaged bank note using a number of pixels in the extracted image contour.

3. The method as claimed in claim 2, wherein the calculating of the area of the damaged bank note using the number of pixels comprises calculating the area of the damaged bank note using the number of pixels in the extracted image contour and a scanning resolution of the generated image data.

4. The method as claimed in claim 2, wherein the calculating of the area of the damaged bank note using the number of pixels comprises, if the damaged bank note comprises a plurality of disconnected pieces, calculating the area of the damaged bank note using a total number of pixels in the extracted image contours of the respective pieces.

5. The method as claimed in claim 1, wherein the outputting of the damaged bank note information comprises displaying the damaged bank note information through a display part of the image forming apparatus and/or a host display part of a host apparatus connected to the image forming apparatus.

6. The method as claimed in claim 1, wherein the outputting of the damaged bank note information comprises printing, by the image forming apparatus, the damaged bank note information.

7. The method as claimed in claim 1, further comprising confirming a kind of the damaged bank note.

8. The method as claimed in claim 1, further comprising calculating the exchangeable value of the damaged bank note based on a ratio between the calculated area of the damaged bank note and a predetermined area of an original bank note.

9. The method as claimed in claim 8, wherein the calculating of the exchangeable value comprises calculating the exchangeable value according to a predetermined exchange guideline stored in the image forming apparatus.

10. The method as claimed in claim 1, wherein the damaged bank note information comprises a kind of the damaged bank note, an area of an original bank note, a ratio between the area of the damaged bank note and the area of the original bank note, an image of the damaged bank note, and/or an image of the original bank note.

11. The method as claimed in claim 1, further comprising selecting a damaged bank note measuring mode in the image forming apparatus.

12. An image forming apparatus, comprising:

an output unit;

a scanning unit to scan a damaged bank note and to generate image data therefrom; and a controller to calculate an area of the damaged bank note using the generated image data of the scanned damaged bank note and to control the output unit to output damaged bank note information including the calculated area of the damaged bank note and/or an exchangeable value of the damaged bank note corresponding to the calculated area of the damaged bank note.

13. The apparatus as claimed in claim 12, wherein the controller extracts an image contour of the damaged bank note and calculates the area of the damaged bank note based on a number of pixels in the extracted image contour.

14. The apparatus as claimed in claim 13, wherein, if the damaged bank note comprises a plurality of disconnected pieces, the controller calculates the area of the damaged bank note using a total number of pixels in the extracted image contours of the respective pieces.

15. The apparatus as claimed in claim 12, wherein the output unit comprises a communication unit to communicate with a host apparatus, wherein the controller controls the communication unit to transmit the damaged bank note information to the host apparatus.

16. The apparatus as claimed in claim 12, wherein the controller confirms a kind of the damaged bank note based on the image data of the scanned damaged bank note.

17. The apparatus as claimed in claim 12, wherein the damaged bank note information comprises a kind of the damaged bank note, an area of an original bank note, a ratio between the area of the damaged bank note and the area of the original bank note, an image of the damaged bank note, and/or an image of the original bank note.

18. The apparatus as claimed in claim 12, further comprising a selection unit through which a damaged bank note measuring mode is selected by a user.

19. The apparatus as claimed in claim 12, wherein the output unit comprises at least one of a display unit to display the damaged bank note information and a printing unit to print the damaged bank note information.

20. An image forming system to determine an exchangeable value of a damaged bank note, the system comprising:

a host apparatus comprising a host display unit; and an image forming apparatus, comprising:

a communication unit to communicate with the host apparatus;

a scanning unit to scan the damaged bank note and to generate image data therefrom; and a controller to calculate an area of the damaged bank note using the generated image data of the scanned damaged bank note and to control the communication unit to transmit damaged bank note information including the calculated area of the damaged bank note and/or the exchangeable value of the damaged bank note corresponding to the calculated area of the damaged bank note to the host apparatus, wherein the host display unit displays the damaged bank note information received from the image forming apparatus.

21. The system as claimed in claim 20, wherein the host apparatus further comprises a host controller to control the host display unit to display the exchangeable value of the damaged bank note corresponding to the area of the damaged bank note.

22. A control method of determining an exchangeable value of a damaged bank note, the method comprising:

receiving, in a host device, image data corresponding to the damaged bank note;

calculating the exchangeable value of the damaged bank note corresponding to an area of the damaged bank note based on a predetermined exchange guideline stored in the host device; and receiving, in the host device from an external device, the area of the damaged bank note.

* * * * *